US012644473B2

(12) United States Patent (10) Patent No.: US 12,644,473 B2

Kloft et al. (45) Date of Patent: Jun. 2, 2026

(54) HYDRAULIC ACCUMULATOR

(71) Applicant: Hydac Technology GmbH, Sulzbach / Saar (DE)

(72) Inventors: Peter Kloft, Ransbach-Baumbach (DE); Torsten Kusserow, Thörnich (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 446 days.

(21) Appl. No.: 18/258,650

(22) PCT Filed: Jan. 7, 2022

(86) PCT No.: PCT/EP2022/050248

§ 371 (c)(1),
(2) Date: Jun. 21, 2023

(87) PCT Pub. No.: WO2022/152624

PCT Pub. Date: Jul. 21, 2022

(65) Prior Publication Data

US 2024/0035490 A1 Feb. 1, 2024

(30) Foreign Application Priority Data

Jan. 14, 2021 (DE) ..................... 10 2021 000 139.7

(51) Int. Cl.
    *F15B 1/10* (2006.01)
    *B23K 26/24* (2014.01)
    (Continued)

(52) U.S. Cl.
    CPC .............. *F15B 1/106* (2013.01); *B23K 26/24* (2013.01); *F15B 1/125* (2013.01); *F15B 1/14* (2013.01);
    (Continued)

(58) Field of Classification Search
    CPC .. F15B 1/106; F15B 1/125; F15B 1/14; F15B 2201/205; F15B 2201/3151; F15B 2201/605; B23K 26/24
    (Continued)

(56) References Cited

U.S. PATENT DOCUMENTS 2,192,548 A * 3/1940 Gunderson ........... B60T 17/081
                                                  92/135
2,378,517 A * 6/1945 Trautman .................. F15B 1/04
                                                  220/721
(Continued)

FOREIGN PATENT DOCUMENTS

DE    2139367 A1    2/1973    ............. B23K 15/00
DE    3040053 A1    5/1981    ................ F15B 1/14
    (Continued)

OTHER PUBLICATIONS

German Office Action, Application No. 102021000139.7, 6 pages, Aug. 20, 2021.
(Continued)

*Primary Examiner* — David R Deal
(74) *Attorney, Agent, or Firm* — Slayden Grubert Beard PLLC

(57) ABSTRACT

The disclosure relates to a hydraulic accumulator, in particular a diaphragm accumulator, comprising an accumulator housing and a separating element which is arranged therein and separates two media chambers from each other. The accumulator housing has at least one fluid connection point which opens into an adjacent media chamber and has a connection body with a fluid passage point that is connected to the accumulator housing via a welding seam. The connection body has an annular outer circumferential surface on the connection region facing the accumulator housing, and when the end face of the connection body is placed
(Continued)

on the accumulator housing, the connection body forms a transition point, along which the welding seam runs.

13 Claims, 3 Drawing Sheets

(51) Int. Cl.
F15B 1/12 (2006.01)
F15B 1/14 (2006.01)
(52) U.S. Cl.
CPC . *F15B 2201/205* (2013.01); *F15B 2201/3151* (2013.01); *F15B 2201/605* (2013.01)
(58) Field of Classification Search
USPC .......................................................... 138/30
See application file for complete search history.

(56) References Cited

U.S. PATENT DOCUMENTS

| | | | | |
|---|---|---|---|---|
| 3,847,182 | A | 11/1974 | Greer | 138/30 |
| 3,880,326 | A * | 4/1975 | Kennard | B65D 88/62 |
| | | | | 222/95 |
| 4,077,100 | A | 3/1978 | Zahid | 29/890.06 |
| 4,098,297 | A | 7/1978 | Zahid | 138/30 |
| 4,691,739 | A * | 9/1987 | Gooden | H05K 7/20272 |
| | | | | 73/40.5 R |
| 4,777,983 | A * | 10/1988 | Steveley | F15B 1/10 |
| | | | | 138/30 |
| 6,901,965 | B2 | 6/2005 | Baltes et al. | 138/30 |

FOREIGN PATENT DOCUMENTS

| | | | | |
|---|---|---|---|---|
| DE | 3404897 | A1 | 8/1985 | F15B 1/14 |
| DE | 2604959 | C2 | 11/1986 | F15B 1/08 |
| DE | 2719060 | C2 | 8/1987 | F15B 1/08 |
| DE | 102015012357 | A1 | 3/2017 | F15B 1/12 |
| DE | 102017006064 | A1 | 12/2018 | F15B 1/10 |
| EP | 1370772 | A1 | 8/2004 | F15B 1/08 |
| GB | 2062103 | A | 5/1981 | F15B 1/14 |
| JP | 04244603 | A | 9/1992 | F15B 1/08 |
| WO | 2022/152624 | A1 | 7/2022 | F15B 1/10 |

OTHER PUBLICATIONS

International Search Report and Written Opinion, Application No. PCT/EP2022/050248, 9 pages, Mar. 18, 2022.
International Preliminary Report on Patentability, Application No. PCT/EP2022/050248, 12 pages, Jul. 4, 2023.

* cited by examiner

HYDRAULIC ACCUMULATOR

CROSS-REFERENCE TO RELATED APPLICATIONS

This application claims priority to German Patent Application No. DE 10 2021 000 139.7, filed on Jan. 14, 2021 with the German Patent and Trademark Office. The contents of the aforesaid patent application are incorporated herein for all purposes.

TECHNICAL FIELD

The invention relates to a hydraulic accumulator, in particular a diaphragm accumulator, comprising an accumulator housing and a separating element which is arranged therein and separates two media chambers from each other, the accumulator housing comprising at least one fluid connection point which opens into an adjacent media chamber and has a connection body with a fluid passage point that is connected to the accumulator housing via a welding seam.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

DE 10 2017 006 064 A1 discloses a hydraulic accumulator having an accumulator housing defining a longitudinal axis, in which a diaphragm consisting of elastomer material separates a liquid side from a gas side as a movable separating element, the diaphragm being fixed to the inside of the housing at its opening edge. In order to obtain a slim design for the hydraulic accumulator, the diaphragm, in its undeformed state, has a length, measured in the direction of the longitudinal axis, which is at least twice the diameter of its opening edge, the undeformed diaphragm extending between said opening edge and its closed end region with straight generating lines, which converge in the direction of the end region.

The accumulator housing of the hydraulic accumulator comprises, both on the gas side and on the liquid side, a nozzle-like connection body, which has a fluid passage point in the centre thereof on each side, forming a fluid channel which extends in the direction of the longitudinal axis of the hydraulic accumulator and, on the one hand, forms a gas port for filling the gas side with a working gas, such as nitrogen, and, on the other hand, forms a liquid port for connecting the hydraulic accumulator to a hydraulic system which is then connected in a fluid-conveying manner, in particular conveying hydraulic oil, to the liquid side. The respective connection body comprises a peripheral groove on its connection region facing the outside of the housing, said groove serving to receive a welding filler material which is required to connect the respective connection body permanently to the accumulator housing as part of a fusion welding method, producing a fillet weld.

DE 10 2015 012 357 A1 discloses a further diaphragm accumulator, consisting of at least two housing parts of an accumulator housing, in which a separating element in the form of a separating diaphragm separates two media chambers from one another and with at least one media connection body connected to one housing part along a welding seam. In this process, the connection body engages at least partially in a receiving area, which is formed in one housing part along a housing opening as a fluid passage point, wherein the wall faces of the accumulator housing part and the connection body, which are adjacent and facing one another in the receiving area, are permanently connected to one another by means of the welding seam. Said welding seam can be produced by soldering, friction welding, electron beam welding or laser beam welding, preferably without welding filler material. Instead of a fillet weld to be inserted in the groove on the outside, as disclosed in DE 10 2017 006 064 A1, the inner welding seam, in the form of a smooth seam, guarantees a positive connection to withstand transverse forces, which permits a particularly secure permanent connection. The welding seam, on the inside in this case, and shielded from the environment, is also protected from detrimental environmental influences that might lead to corrosion. However, said smooth welding seam has to be produced from the inside of the shell part of the housing part between its adjacent inner wall and the outer wall of the connection body which is engaged in this respect, which is accordingly complicated and expensive to produce.

SUMMARY

Based on this, a need exists to retain benefits of the known solutions, notably to produce a very strong weld joint between connection bodies forming fluid connection points and associated accumulator housings such that the corresponding production outlay is reduced.

The need is addressed by the subject matter of the independent claims. Embodiments of the invention are described in the dependent claims, the following description, and the drawings.

DESCRIPTION

Figure 2:
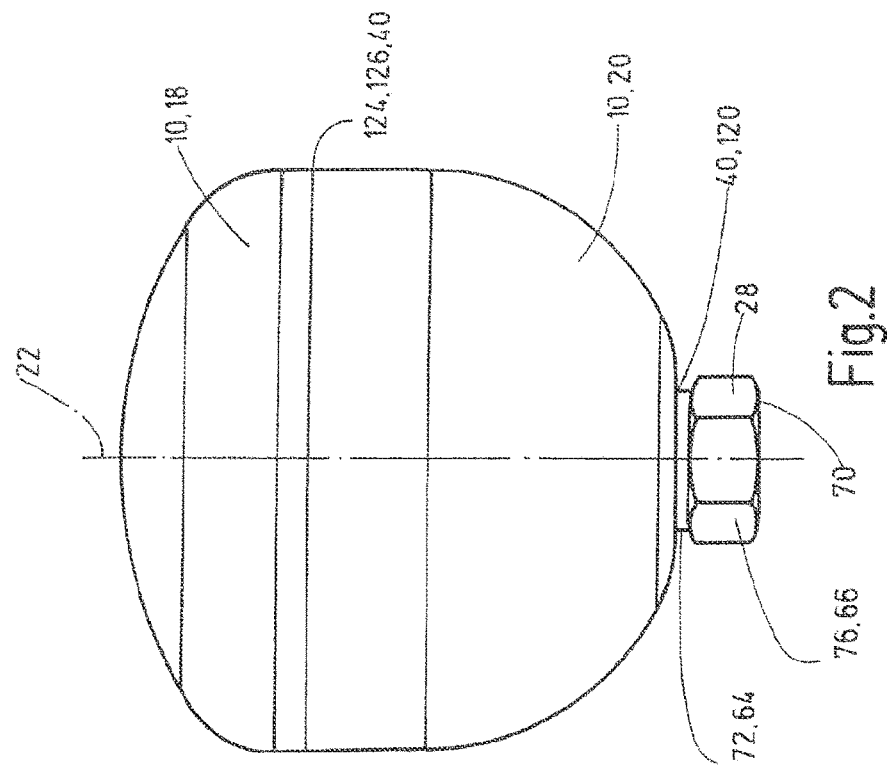
FIGS. 1 and 2 show an embodiment of an hydraulic accumulator in longitudinal section in one case and as a front view in the other case.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a hydraulic accumulator with a connection body comprises an annular outer circumferential area on its connection region facing the accumulator housing and in that, when the end face of the connection body is placed on the accumulator housing, the connection body forms a transition point with said housing, along which the welding seam runs. In this case, it is not necessary to form a groove in the connection body that will later be used to receive a fillet welding seam that surrounds the joint or the transition point between connection body and adjacent housing wall with a wedge-shaped protruding edge in both directions.

While, in the known hydraulic accumulator solution according to DE 10 2017 006 064 A1, the corresponding fillet weld has to be applied in one pass with optimum root penetration, leading to high production outlay, particularly because, in many cases, a welding filler material is required to carry out fusion welding, this is avoided in the present solution because the weld seam joint is created directly at the transition point, between parts of the closed, annular outer circumferential surface of the connection region and the top side of the accumulator housing in this joining region. As no welding filler material is required, this also provides effective resistance to potential corrosion hazards and the added material, which would otherwise be formed by root penetration when producing the fillet weld, does not arise in the components to be connected, which can otherwise lead to material damage in the joining region. The weld joint ends at the transition point with substantially no overhang and is designed as a thin welding line.

In some embodiments of the hydraulic accumulator, it is provided that the outer circumferential surface of the connection body transitions into a peripheral edge at its free end, from which edge a flat contact surface is connected in the direction of the fluid connection point or a depression made in the end face of the connection body. As such, a thin boundary surface arises between the connection body and the adjacent wall parts of the accumulator housing, which forms the linear transition point for applying the welding seam. If the accumulator housing wall is designed as a flat plane, the adjacent contact surface of the connection body can also be designed to be flat. If, on the other hand, the accumulator housing wall has a corresponding curvature, particularly if it follows a convex wall shape when viewed from outside, it is beneficial to incorporate a depression in the connection body, starting from the peripheral edge and moving inwards in the direction of the fluid connection point, said depression for example following the convex shape of the accumulator housing wall. In both cases, there is then direct contact between adjacent wall surfaces of the connection body and the associated parts of the accumulator housing wall, with the result that, when the welding seam is applied in the transition region thus formed over a relatively large surface area, a fixed connection between said components is achieved.

From the perspective of the operating pressure of the respective hydraulic accumulator, it is beneficial that the flat contact surface of the connection body is placed on an accumulator housing wall that is also flat, said wall surrounding one fluid connection point, particularly for the passage of liquid, such as hydraulic oil. On the other hand, the gas reservoir in the accumulator housing of the hydraulic accumulator is respectively curved outwards or designed to be convex as part of reliable operating pressure uptake, with the result that a corresponding depression is accordingly accommodated in the connection body to be securely welded.

For example, in this process, the depression does not need to follow the convex wall profile directly but may also be formed from an annular cone with a shallow inclination of 4° to 10°, for example approximately 6°, which makes it easier to manufacture the connection body.

In order to provide high welding energy levels, it is for example provided that the peripheral edge of the connection body is part of the weld seam joint between the connection body and the adjacent accumulator housing, and the weld seam joint is produced using a laser or as part of an electron beam welding method.

In order to produce corresponding fluid connections, in example hydraulic accumulators it is provided that the outer or inner circumferential side of the connection body in the region of the fluid passage point is furnished with a corresponding threaded part. In further embodiments of the hydraulic accumulator, it is provided that the accumulator housing is formed in two parts, for example consisting of shell parts, and in that the accumulator housing parts are connected to the accumulator housing on their adjacent end faces using the same welding method as the connection body. As such, all necessary weld joints on the accumulator housing can be produced from outside with only one welding apparatus, for example by using a laser.

The disclosure also relates to a connection body for a hydraulic accumulator solution as described above, with which such hydraulic accumulators can also be retrofitted if required.

A beneficial manufacturing method for such weld joints for a hydraulic accumulator is characterised in that a laser or electron beam produces the weld seam joint at right angles and peripherally between the edge of the connection body and the adjacent accumulator housing wall, the welding apparatus for example being located in a stationary position and the hydraulic accumulator being mounted such that it can move around its longitudinal axis as a rotationally symmetrical component, the rotation speed of the accumulator being adjusted to the welding speed of the manufacturing apparatus.

As the welding seam can be produced without force from the outer circumferential side of the accumulator housing and the connection body, the welding seam can effectively be produced from outside, which is significantly simpler and cheaper from a production perspective, than when, as disclosed in DE 10 2015 012 357 A1, the weld joint has to be produced as a smooth seam from the inside of the relevant shell-shaped accumulator housing part. Due to the thin, linear shape of the welding seam, the welding seam can be produced in real time, which means that considerable savings can be made during production, especially in mass production scenarios.

The solution according to the teachings herein is explained in greater detail below with the aid of further embodiments with reference to the drawings, which are shown as outline, non-definitive diagrams.

Specific references to components, process steps, and other elements are not intended to be limiting. Further, it is understood that like parts bear the same or similar reference numerals when referring to alternate FIGS.

Figure 1:
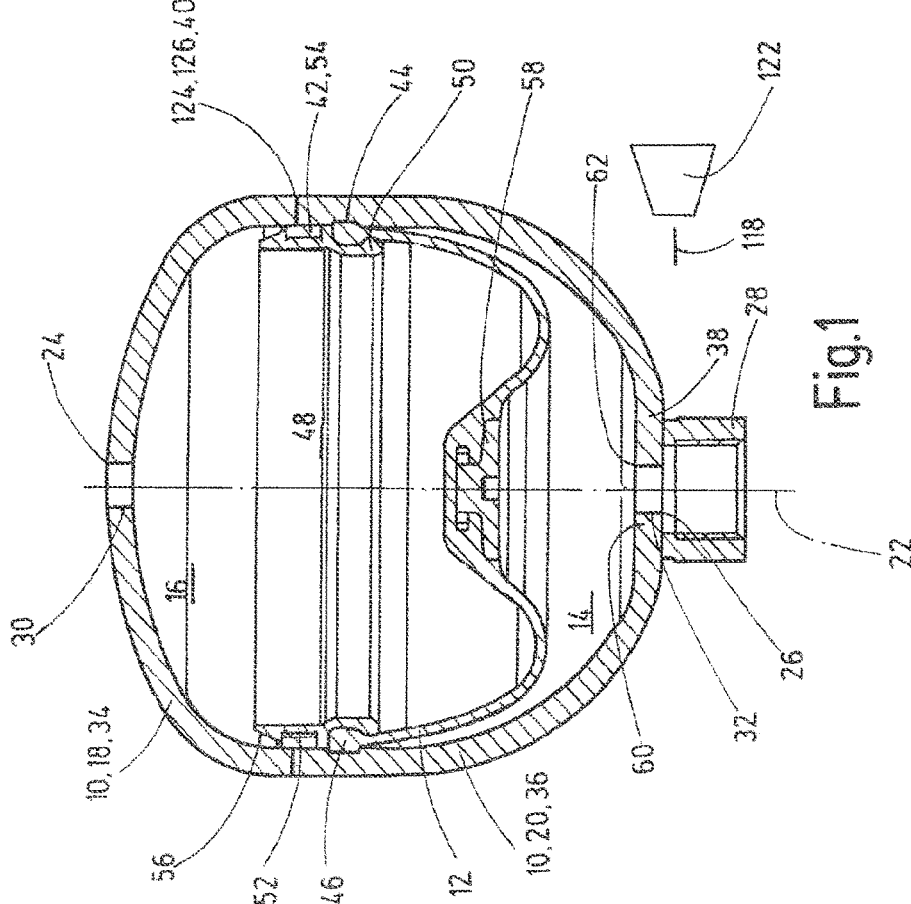
Figure 4:
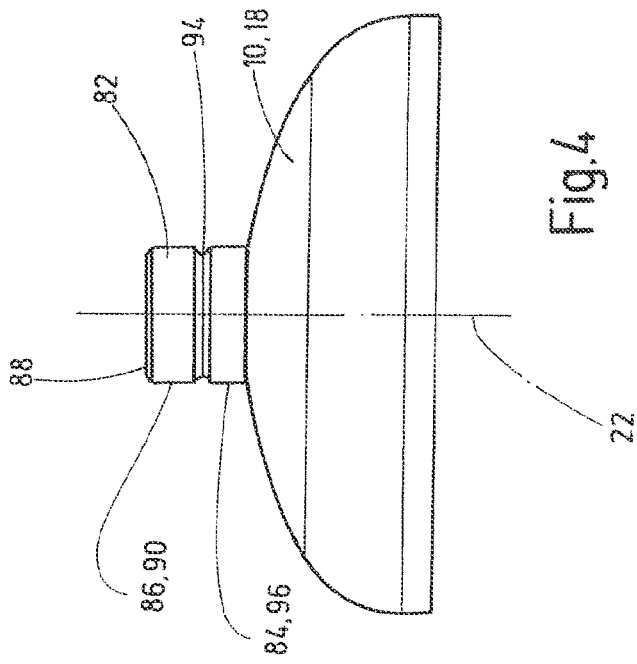
FIGS. 3 and 4 show the upper housing wall shell of the hydraulic accumulator according to FIGS. 1 and 2, with the connection body securely welded on the gas side, in longitudinal section in one case, and as a front view in the other case.
Figure 3:
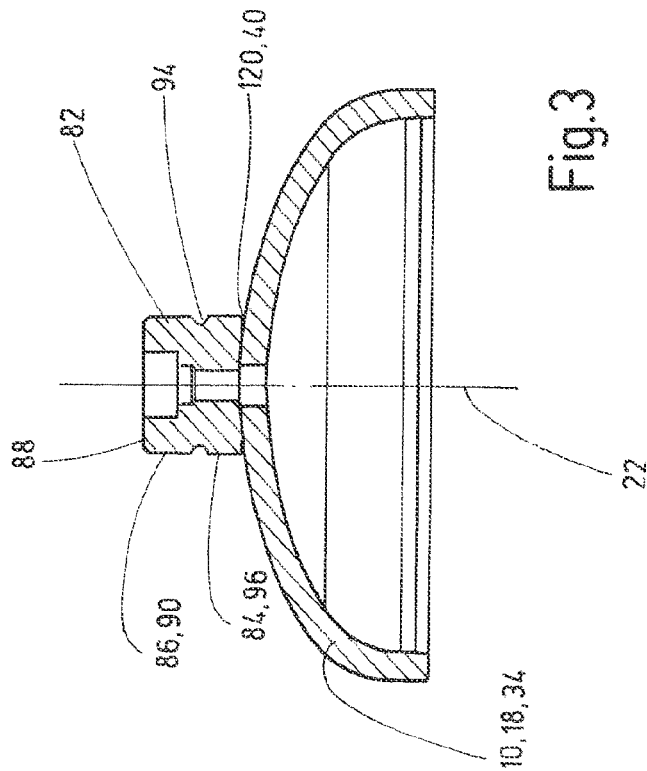
Figure 6:
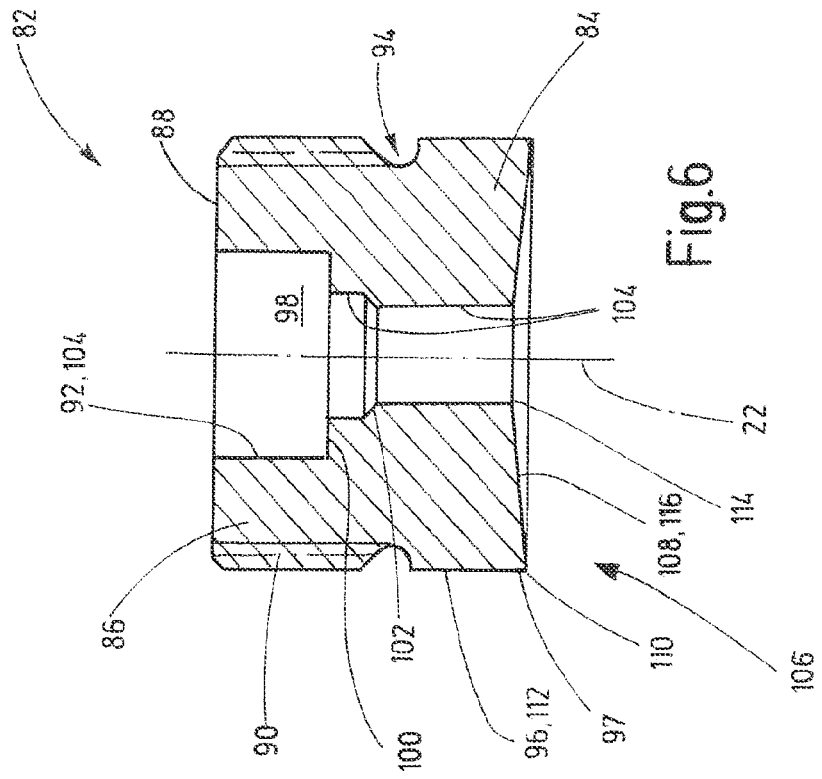
FIGS. 5 and 6 both show longitudinal sections of the connection body used on the liquid side according to FIGS. 1 and 2 and the connection body on the gas side according to the image shown in FIGS. 3 and 4 respectively.
Figure 5:
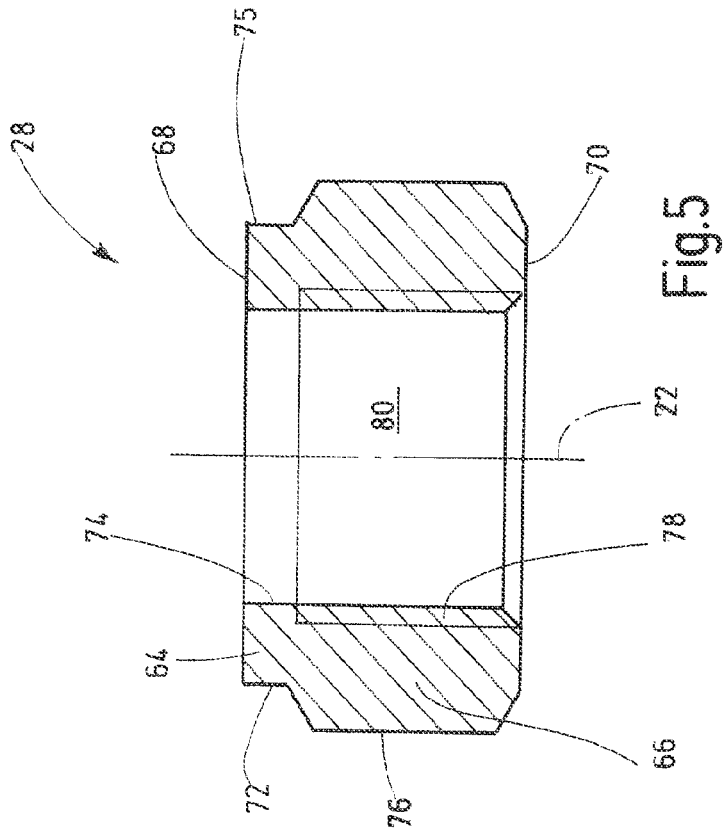

The hydraulic accumulator shown in FIGS. 1 and 2 is a so-called diaphragm accumulator with a separating element 12 arranged in an accumulator housing referred to in its entirety as 10, said separating element being in the form of a diaphragm. Said diaphragm divides the inside of the housing 10 into one media chamber 14 in the form of a fluid chamber for storing a liquid, in particular hydraulic oil, and a further media chamber 16 in the form of a gas chamber for storing a working gas, in particular nitrogen gas. The housing 10, as viewed on FIG. 1, consists of an upper housing part 18 and a lower housing part 20, each of which consists of a circular shell form with a central axis 22, which corresponds to the longitudinal axis of the hydraulic accumulator. The upper housing part 18 has a shallower shell form than the lower housing part 20. At the opposite end of the accumulator housing 10 to the fluid chamber 14, in other words at the end associated with the gas chamber 16, the upper housing part 18 comprises an upper fluid connection point 24 arranged concentrically with respect to the axis 22. The upper fluid connection point 24 can be sealed with a plug, which is not shown in the figures, or solder after filling the gas chamber 16. A lower fluid connection point 26 is provided on the lower housing part 20, arranged concentrically with respect to the axis 22, a lower connection body 28 being fitted as an oil port to said lower fluid connection point, by means of which body the accumulator can be connected to a hydraulic system (not illustrated).

The upper 18 and the lower 20 housing part comprise a central upper or lower 32 fluid channel respectively, each of which extends along the longitudinal axis 22 starting from the upper fluid collection point 24 centrally through an accumulator housing wall 34 of the upper housing part 18 and emerges in the gas chamber 16 or, starting from the lower fluid connection point 26, extends centrally through an accumulator housing wall 36 of the lower housing part 20 and emerges in the fluid chamber 14. The housing wall 34 of the upper housing part 18 extends away from the lower housing part 20, starting from a constant outer diameter, and towards the longitudinal axis 22 of the hydraulic accumulator to the central upper fluid channel 30 curving outwards. Starting from a constant outer diameter, the housing wall 36 of the lower housing part 20 initially extends away from the upper housing part 18 and towards the longitudinal axis 22 of the hydraulic accumulator, curving inwards, and then transitions into a disc-shaped plate 38 which is flat on both sides, through which the lower fluid channel 32 extends centrally.

The upper 18 and the lower 20 housing part, which abut one another along a welding seam interface 40, are connected together by means of a laser or electron beam welding method.

In the region of the interface 40, a protective ring 42 in the form of a flat metal ring is fixed to the inner wall of the accumulator housing 10. In order to fix the diaphragm 12 in the accumulator housing 10, an annular groove-shaped notch 44 is formed in the inner wall of the lower housing part 20 at a distance from the protective ring 42. The notch 44 forms a seat for a thickened, circumferential edge bead 46 of the diaphragm 12.

To securely engage the edge bead 46 with the notch 44, a retaining ring 48 is provided, which comprises a retaining part 50 that forms a partial enclosure of the inside of the edge bead 46 offset inwards from the outer circumference of the retaining ring 48. Extending axially from the retaining part 50 in the direction of the upper housing part 18, the retaining ring 48 comprises an annular cylinder part 52, which extends beyond the welding region 40 between the two housing parts 18, 20. On the outer circumference, the cylinder part 52 forms an annular groove 54 as a seat for the protective ring 42. This can be snapped into position in the annular groove 54 by moving over inclined surfaces 56 at the free end of the cylinder part. For assembly purposes, the diaphragm 12 can be inserted into the lower housing part 20 together with the retaining ring 48 and the protective ring 42 when the accumulator housing 10 is open, wherein, in the inserted position, the protective ring 42 moves into a position covering the welding region 40.

FIG. 1 shows the diaphragm accumulator in an operating position in which the diaphragm 12 is in an intermediate position in which pressure equilibrium prevails on both sides of the diaphragm 12 because the hydraulic system connected to the lower connection body 28 forming the oil port, but which is not shown, generates a fluid pressure in the fluid chamber 14 which corresponds to the pressure prevailing in the gas chamber 16. In conditions in which there is only a low oil pressure or no oil pressure in the fluid chamber 14, the diaphragm 12 moves downwards when viewed in the direction shown in the figure, and lies on the inside of the bottom housing part 20, wherein the diaphragm 12 with a valve body 58 located on its central surface region covers an edge 60, forming a valve seat, of the opening 62 of the lower fluid channel 32 into the fluid chamber 14 and thus forms a valve arrangement at the opening 62 of the fluid channel 32 into the fluid chamber 14.

For example, the lower fluid connection point 26 is not sealed by a plug or solder but comprises a lower connection body 28, which is formed by a connecting element 64 lying on the lower housing part 20 and a connecting part 66 connected integrally to the connecting element 64 in the direction leading away from the lower housing part 20.

A first end face 68, forming a contact surface for the lower housing part 20, of the connecting element 64 and a second end face 70, opposite the first end face 68, of the connecting part 66 of the lower connection body 28 are each flat and aligned perpendicular to the longitudinal axis 22 of the hydraulic accumulator. The first end face 68 transitions on its radial outer and inner end in each case into a cylindrical, annular and recess-free outer 72 or inner circumferential surface 74 of the connecting element 64, which is aligned coaxially with respect to the longitudinal axis 22 of the hydraulic accumulator. An annular end region, facing the lower housing part 20, of the outer circumferential surface 72 of the connecting element 64 forms an edge 75, which is part of a weld seam joint 40 between the connection body 28 and the lower housing part 20. In the direction leading away from the lower housing part 20, an external hexagon 76 of the connecting part 66 is connected to the outer circumferential surface 72 of the connecting element 64 and a female thread 78 of the connecting part 66 is connected to the inner circumferential surface 74 of the connecting element 64 to engage a male thread of a fluid pipe which is not shown in the figures, which in each case transition into the second end face 70 of the connecting part 66 at their end facing away from the lower housing part 20. A central fluid passage point 80 to allow fluid to pass through the lower connection body 28 is formed by the corresponding hollow design of the lower connection body 28. The smallest internal diameter of the fluid passage point 80 is larger than, in particular approximately 1.8 times larger than, the internal diameter of the lower fluid channel 32 through the lower housing part 20. The diameter of the disc-shaped plate 38 of the lower housing part 20 is larger than the external diameter of the lower connection body 28, at least in the region of its connecting element 64.

The upper fluid connection point 24 comprises an upper circular-cylindrical connection body 82. This is a gas port of the standard type with an internal filling valve, which is not shown in more detail in the figures, through which the gas chamber 16 can be pre-filled with a working gas, in particular nitrogen gas.

The connection body 82 is formed by a further connecting element 84 lying on the upper housing part 18 and a further connecting part 86 connected integrally to the further connecting element 84 in the direction leading away from the upper housing part 18.

An end face 88, facing away from the upper housing part 18, of the further connecting part 86 of the upper circular-cylindrical connection body 82 is annular and designed to be flat and aligned perpendicular to the longitudinal axis 22 of the hydraulic accumulator. At its radial outer end, the end face 88, facing away from the upper housing part 18, of the further connecting part 86 of the upper connection body 82 transitions into a male thread 90 and at its radial inner end into a circular-cylindrical, annular and recess-free inner circumferential surface 92 of the further connecting part 86. The male thread is used to engage with a female thread of a fluid pipe, which is not shown on the figures, or a screw cap made from plastics material to cover the upper connection body 82. In the direction leading towards the upper housing part 18, a nose-shaped annular recess 94, viewed in cross-section, in the outer circumference of the upper connection body 82 is connected to the male thread 90, said recess being aligned perpendicular to the longitudinal axis 22 of the hydraulic accumulator, completely surrounds the circumference of the upper connection body 82 and forms an outlet for the male thread 90 of the upper connection body 82. In the direction leading towards the upper housing part 18, a circular-cylindrical, annular and recess-free outer circumferential surface 96 of the further connecting element 84 is connected to the nose-shaped recess 94. An annular end region, facing the lower housing part 18, of the outer circumferential surface 96 of the further connecting element 84 forms an edge 97, which is part of a weld seam joint 40 between the connection body 82 and the upper housing part 18. The internal diameter of a central fluid passage point 98 in the upper connection body 82 decreases, starting from the end face 88 facing away from the upper housing part 18, in the direction of the upper housing part 18, forming a step 100, and a subsequent conically tapering transition region 102. A circular-cylindrical, annular and recess-free inner circumferential surface 104 of the fluid passage point 98 is in each case provided between the end face 88 facing away from the upper housing part 18 and the step 100, between the step 100 and the transition region 102, and between the transition region 102 and the end 114, facing the upper housing part 18, of the fluid passage point 98.

A depression 108 is incorporated in one side 106, facing the upper housing part 18, of the upper cylindrical connection body 82. The end 110, facing the upper housing part 82, of the outer wall 112 of the upper connection body 82 protrudes over the end 114, facing the upper housing part 18, of the fluid passage point 98 that forms the maximum depression 108. The minimum depression 108 is provided in direct connection with the end 110, facing the upper housing part 18, of the outer wall 112 of the upper connection body 82. The base 116 of the depression 108 runs conically in the direction of the longitudinal axis 22 of the hydraulic accumulator and away from the lower housing part 20 between the end 110, facing the upper housing part 18, of the outer wall 112 of the upper connection body 82 and the end 114, facing the upper housing part 18, of the fluid passage point 98. The angle of conicity of the base 116 compared with a notional plane aligned perpendicular to the longitudinal axis 22 of the hydraulic accumulator is adapted to the curvature of the outer wall of the upper housing part 18 in the region around the upper fluid port 30 and is for example approximately 6 degrees.

In order to weld the respective housing part 18, 20 to the associated connection body 28, 82, the flat first end face 68, forming a contact surface, of the connecting element 64 of the lower connection body 28 is placed on the disc-shaped plate 38 of the lower housing part 20 from outside and aligned coaxially so that the flat first end face 68 of the connecting element 64 of the lower connection body 28 is in contact with the plate 38 across its entire surface. In addition, the further connecting element 84 of the upper connection body 82 with its conically extending depression 108 is placed on the curved upper housing part 18 from outside and aligned coaxially, wherein the upper housing part 18 with its curved outer wall engages in the depression 108. In this process, the base 116 is in contact with the upper housing part 18 with some of its entire surface, especially in the region of the edge 97, in an annular-linear or annular manner. Subsequently, a laser or electron beam 118 aligned perpendicular to the longitudinal axis 22 of the hydraulic accumulator is applied to a respective linear and annular transition point 120 between the edge 75, 97 of the outer circumferential surface 72, 96 of the connecting element 64, 84 of the respective connection body 28, 82 and the outer wall of the respective accumulator housing part 18, 20 and produces a welding seam 40 at this point, particularly by melting the connection body, at least at the edge 75, 97 and/or the outer wall of the respective accumulator housing part 18, 20 at least in the region of this edge 75, 97, by means of which weld seam the respective connection body 28, 82 is securely connected to the adjacent housing part 18, 20. In this process, the edge 75, 97 of the respective connection body 28, 82 and/or the outer wall of the respective accumulator housing part 18, 20 is part of the weld seam joint 40. Furthermore, the welding method is carried out free from any welding filler materials.

The welding apparatus 122 producing the beam 118 is arranged such that it is stationary and the rotationally symmetrical hydraulic accumulator is rotated around its longitudinal axis 22 at a rotation speed adapted to the welding speed of the welding apparatus 122.

Both housing parts 18, 20 are welded together at their end faces facing one another 124 at their open ends using the same welding method. When carrying out welding to seal the housing 10, the protective ring 42 is welded securely to the inside of the accumulator housing 10 in the joining region 126 of both housing parts 18, 20 and forms a thermal shield with respect to the retaining ring 48. As a result, the retaining ring 48 can be made economically and cost-effectively from a structurally strong plastics material as an injection-moulded part.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A hydraulic accumulator, comprising an accumulator housing and a separating element which is arranged therein and separates two media chambers from each other, the accumulator housing comprising at least one fluid connection point which opens into an adjacent media chamber and has a first connection body with a fluid passage point that is connected to the accumulator housing via a welding seam; wherein the connection body has an annular outer circumferential surface on the connection region facing the accumulator housing; wherein when the end face of the connection body is placed on the accumulator housing, the connection body forms a transition point, along which the welding seam runs; wherein the outer circumferential surface of the connection body transitions into a peripheral edge at its free end, from which edge a depression made in the end face of the connection body is connected; wherein the course of the depression in the connection body is adapted to a curved accumulator housing wall, which has a convex curvature in the region of the welding seam, viewed in cross-section, and which at least partially engages in the depression and which surrounds a further fluid connection point wherein the depression forms an annular come with a shallow inclination of 4° to 10°.

2. The hydraulic accumulator of claim 1, wherein the peripheral edge of the connection body is part of the weld seam joint between connection body and accumulator housing and wherein the weld seam joint is produced using a laser or electron beam welding method.

3. The hydraulic accumulator of claim 1, wherein the outer or inner circumferential side of the connection body in the region of the fluid passage point comprises a threaded part as part of a connecting part for the purpose of connecting a fluid line, said threaded part being offset from a connecting element of the connection body, which is at least partly used to apply the welding seam and comprises the annular outer circumferential surface.

4. The hydraulic accumulator of claim 1, wherein the accumulator housing is formed as two parts and the accumulator housing parts are connected to the accumulator housing on their adjacent end faces using the same welding method as the connection body.

5. The hydraulic accumulator of claim 1, wherein the hydraulic accumulator is a diaphragm accumulator.

6. The hydraulic accumulator of claim 1, wherein the depression forms an annular cone with a shallow inclination of approximately 6°.

7. The hydraulic accumulator of claim 1, wherein the accumulator housing is formed as two shell parts and the accumulator housing parts are connected to the accumulator housing on their adjacent end faces using the same welding method as the connection body.

8. The hydraulic accumulator according to claim 1, wherein the accumulator housing has a further fluid connection point, which opens into the other adjacent media chamber and which has a further connection body with a further fluid passage point that is connected to the accumulator housing via a further welding seam, wherein the further connection body has an annular outer circumferential surface on its connection region facing the accumulator housing, wherein when the end face of the further connection body is placed on the accumulator housing, the further connection body forms a transition point, along which the welding seam runs, wherein the outer circumferential surface of the further connection body transitions at its free end into a peripheral edge, from which a flat contact surface is connected in the direction of the further fluid connection point.

9. The hydraulic accumulator of claim 8, wherein the flat contact surface of the further connection body is placed on an accumulator housing wall that is also flat, said wall surrounding the further fluid connection point.

10. The hydraulic accumulator of claim 8, wherein the peripheral edge of the connection bodies is part of the welding seam joint between the connection body (28, 82) and accumulator housing and wherein the welding seam joint is produced using a laser or electron beam welding method.

11. The hydraulic accumulator of claim 8, wherein the outer or inner circumferential side of the connection body in the region of the fluid passage point comprises a threaded part as part of a connecting part for the purpose of connecting a fluid line, said threaded part being offset from a connecting element of the connection body, which is at least partly used to apply the welding seam and comprises the annular outer circumferential surface.

12. The hydraulic accumulator of claim 8, wherein the accumulator housing wall runs in a straight line in the region of the welding seam of the further connection body, viewed in cross-section.

13. The hydraulic accumulator of claim 8, wherein the accumulator housing is formed as two parts and the accumulator housing parts are connected to the accumulator housing on their adjacent end faces using the same welding method as the connection body.

* * * * *